(12) United States Patent
Jang et al.

(10) Patent No.: US 11,546,516 B2
(45) Date of Patent: Jan. 3, 2023

(54) FOLDED ZOOM TYPE OPTICAL IMAGE STABILIZATION (OIS) CIRCUIT AND CAMERA DEVICE HAVING THE SAME

(71) Applicant: SAMSUNG ELECTRO-MECHANICS CO., LTD., Suwon-si (KR)

(72) Inventors: Nam Hong Jang, Suwon-si (KR); Dae Gil Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/490,666

(22) Filed: Sep. 30, 2021

(65) Prior Publication Data
US 2022/0239834 A1 Jul. 28, 2022

(30) Foreign Application Priority Data
Jan. 27, 2021 (KR) .................. 10-2021-0011623

(51) Int. Cl.
*H04N 5/232* (2006.01)

(52) U.S. Cl.
CPC ..... *H04N 5/23283* (2013.01); *H04N 5/23258* (2013.01); *H04N 5/23296* (2013.01)

(58) Field of Classification Search
None
See application file for complete search history.

(56) References Cited

U.S. PATENT DOCUMENTS

| 2018/0217263 A1* | 8/2018 | Ohtomo | G01C 15/002 |
| 2019/0063922 A1* | 2/2019 | Ohtomo | G01C 3/08 |
| 2020/0249421 A1* | 8/2020 | Hu | G02B 7/08 |
| 2020/0371374 A1 | 11/2020 | Barak et al. | |

FOREIGN PATENT DOCUMENTS

| EP | 0 912 046 A2 | 10/1998 | |
| JP | 2000-350084 A | 12/2000 | |
| JP | 2010-175974 A | 8/2010 | |
| KR | 10-1999-0036573 A | 5/1999 | |
| KR | 10-2019-0098169 A | 8/2019 | |
| KR | 10-2020-0101963 A | 8/2020 | |
| KR | 10-2131597 B1 | 8/2020 | |
| WO | WO 2019/148027 A1 | 8/2019 | |
| WO | WO-2019150188 A1 * | 8/2019 | G02B 27/64 |

OTHER PUBLICATIONS

Korean Office Action dated Feb. 7, 2022, in counterpart Korean Patent Application No. 10-2021-0011623 (7 pages in English and 5 pages in Korean).

\* cited by examiner

*Primary Examiner* — Cynthia Segura
(74) *Attorney, Agent, or Firm* — NSIP Law

(57) ABSTRACT

A folded zoom optical image stabilization (OIS) circuit for driving a prism and a prism actuator, includes an attitude recognition unit configured to recognize housing attitude based on an acceleration sensor value received from an acceleration sensor when an OIS off command is input, and to output housing attitude information, a prism position control unit configured to control a gradual position movement of the prism to a corresponding target position matching the housing attitude information received from the attitude recognition unit, and a prism driving unit configured to move the prism to a target position under a control of the prism position control unit.

20 Claims, 11 Drawing Sheets

| ACCELERATION SENSOR VALUE (Vas) | HOUSING ATTITUDE | | TARGET POSITION (TP) |
|---|---|---|---|
| +Z (Z POSITIVE NUMBER) | [#1] Face Up direction | | X Axis→Hall Max, Y Axis→Hall Min |
| −Z (Z NEGATIVE NUMBER) | [#2] Face Down direction | | X Axis→Hall Max, Y Axis→Hall Max |
| −X (X NEGATIVE NUMBER) | Face Forward | [#3] Prism Up (12 O'clock direction) | X Axis→Hall Max, Y Axis→Hall Min |
| +Y (Y POSITIVE NUMBER) | | [#4] Prism Right (3 O'clock direction) | X Axis→Hall Min, Y Axis→Hall Min |
| +X (X POSITIVE NUMBER) | | [#5] Prism Down (6 O'clock direction) | X Axis→Hall Max, Y Axis→Hall Min |
| −Y (Y NEGATIVE NUMBER) | | [#6] Prism Left (9 O'clock direction) | X Axis→Hall Max, Y Axis→Hall Min |

FIG. 5

FOLDED ZOOM TYPE OPTICAL IMAGE STABILIZATION (OIS) CIRCUIT AND CAMERA DEVICE HAVING THE SAME

CROSS-REFERENCE TO RELATED APPLICATIONS

This application claims the benefit under 35 USC 119(a) of Korean Patent Application No. 10-2021-0011623 filed on Jan. 27, 2021, in the Korean Intellectual Property Office, the entire disclosure of which is incorporated herein by reference for all purposes.

BACKGROUND

1. Field

The present disclosure relates to a folded zoom type optical image stabilization (OIS) circuit and a camera device having the same.

2. Description of the Background

Recently, high-end smartphones have been equipped with a folded zoom camera module to improve the quality of high-magnification zoom photos. Unlike the existing lens-shift type camera modules, which have lenses arranged in a vertical form, the folded zoom camera module has a structure that increases a focal length by refracting light at a right angle like a periscope. In order to refract light at a right angle, a prism capable of optical image stabilization (OIS) is included.

Compared to the existing lens-shift camera module, the folded zoom camera module has an advantage in that it has a wider correction angle, and a wide range of image stabilization is possible, and since it performs image stabilization according to a rotation angle of the prism, even if a focal length is increased, a loss of a maximum correction angle does not occur, so OIS control is easy, especially in high magnification zoom.

However, the conventional camera to which the folded zoom OIS is applied has a problem in that collision noise may be generated by the prism when a camera app on a mobile device is closed after taking a picture.

In addition, there are also causes of magnetic fields such as attraction, or the like, between an OIS pulling magnet and a yoke.

For example, when wide angle and telephoto lenses are continuously switched while changing a zoom magnification in the camera app, there is a problem in that continuous noise (sound) occurs as OIS on/off is repeated.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a folded zoom optical image stabilization (OIS) circuit for driving a prism and a prism actuator, includes an attitude recognition unit configured to recognize housing attitude based on an acceleration sensor value received from an acceleration sensor when an OIS off command is input, and to output housing attitude information, a prism position control unit configured to control a gradual position movement of the prism to a corresponding target position matching the housing attitude information received from the attitude recognition unit, and a prism driving unit configured to move the prism to a target position under a control of the prism position control unit.

The attitude recognition unit may be configured to output a recognition completion signal, when outputting the housing attitude information.

The prism position control unit may include a timer configured to start time counting when a recognition completion signal is input from the attitude recognition unit, a memory configured to output a corresponding target position matching the housing attitude information, and a target change limiter configured to generate a control value that gradually increases to control a gradual position movement of the prism to the corresponding target position during a first time period, based on a time count value of the timer.

The prism driving unit may be configured to control the gradual position movement of the prism to the corresponding target position, based on the control value of the prism position control unit, and to gradually decrease a driving value of the prism, when the prism reaches the corresponding target position.

The prism driving unit may include a proportional-integral-derivative (PID) control unit configured to generate a control signal for controlling the gradual position movement of the prism to the corresponding target position, based on a control value and a feedback value of the prism position control unit, during a first time period, a PID output limiting unit configured to output a control signal from the PID control unit during the first time period, and to gradually decrease a magnitude of the control signal from the PID control unit, during a second time period after the first time period, and a driving unit configured to generate a driving current based on a control signal from the PID output limiting unit, and to output the same to the prism actuator.

The PID control unit may include an analog-to-digital (AD) converter configured to convert a position sensor signal of the prism into a digital feedback value, a first operator configured to operate a feedback value from the AD converter and a control value of the prism position control unit to output an error value, and a PID controller configured to generate a control signal for a gradual position movement of the prism to the corresponding target position, based on the error value from the first operator.

The PID output limiting unit may include a PID output limiter configured to generate a maximum output ratio value during the first time period, and to generate an output ratio value, which gradually decreases, to limit the control signal during a second time period after the first time period, and a second operator configured to generate a control signal of which an output ratio value is adjusted, by multiplying the control signal from the PID control unit and the output ratio value form the PID output limiter.

In another general aspect, a folded zoom camera device includes a prism actuator configured to move a position of a prism, a camera app unit configured to output an optical image stabilization (OIS) off command when a camera app, which is running, is terminated, an acceleration sensor configured to sense housing attitude of the folded zoom camera device to output an acceleration sensor value, an OIS circuit configured to control a gradual position movement of the prism to a target position for each housing attitude corresponding to the acceleration sensor value, while checking the position of the prism by operating the prism actuator, when the OIS off command is input, and a position sensor configured to sense the position of the prism to output a position sensor signal to the OIS circuit.

The OIS circuit may include an attitude recognition unit configured to recognize housing attitude based on an acceleration sensor value from the acceleration sensor when an OIS off command is input from the camera app unit, and to output housing attitude information, a prism position control unit configured to control a gradual position movement of the prism to a corresponding target position matching the housing attitude information received from the attitude recognition unit, and a prism driving unit configured to gradually move the prism to a target position according to a control of the prism position control unit.

The prism driving unit may be configured to control the gradual position movement of the prism to the corresponding target position, based on a control value of the prism position control unit, and to gradually decrease a driving value of the prism, when the prism reaches the corresponding target position.

The folded zoom camera device may further include a camera controller configured to operate an internal timer when the OIS off command is input, and to control power supply stopping of the OIS circuit when the power supply is stopped, and a power supply device configured to stop power supply when there is a power supply stop control from the camera controller, while supplying power to the OIS circuit.

In another general aspect, an optical image stabilization (OIS) circuit for driving a prism includes an attitude recognition unit configured to determine an attitude when an OIS off command is input and to output a target position in response to the attitude determination, and a prism driving unit configured to move the prism gradually to the target position.

The OIS circuit may further include a prism position control unit configured to control the prism driving unit to control the gradual movement of the prism to the target position matching the attitude determination.

A camera device may include the OIS circuit, and a camera app unit configured to output the OIS off command when a camera app, which is running, is terminated.

The camera device may further include a prism actuator configured to receive a driving signal from the prism driving unit to move a position of the prism, an acceleration sensor configured to sense the attitude and to output an acceleration sensor value, wherein the attitude recognition unit is configured to determine the attitude based on the acceleration sensor value, and a position sensor configured to sense a position of the prism and to output a position sensor signal to the prism driving unit as feedback control.

Other features and aspects will be apparent from the following detailed description, the drawings, and the claims.

BRIEF DESCRIPTION OF DRAWINGS

FIG. 5 is a view illustrating a relation table of an acceleration sensor value, housing attitude, and a target position.

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
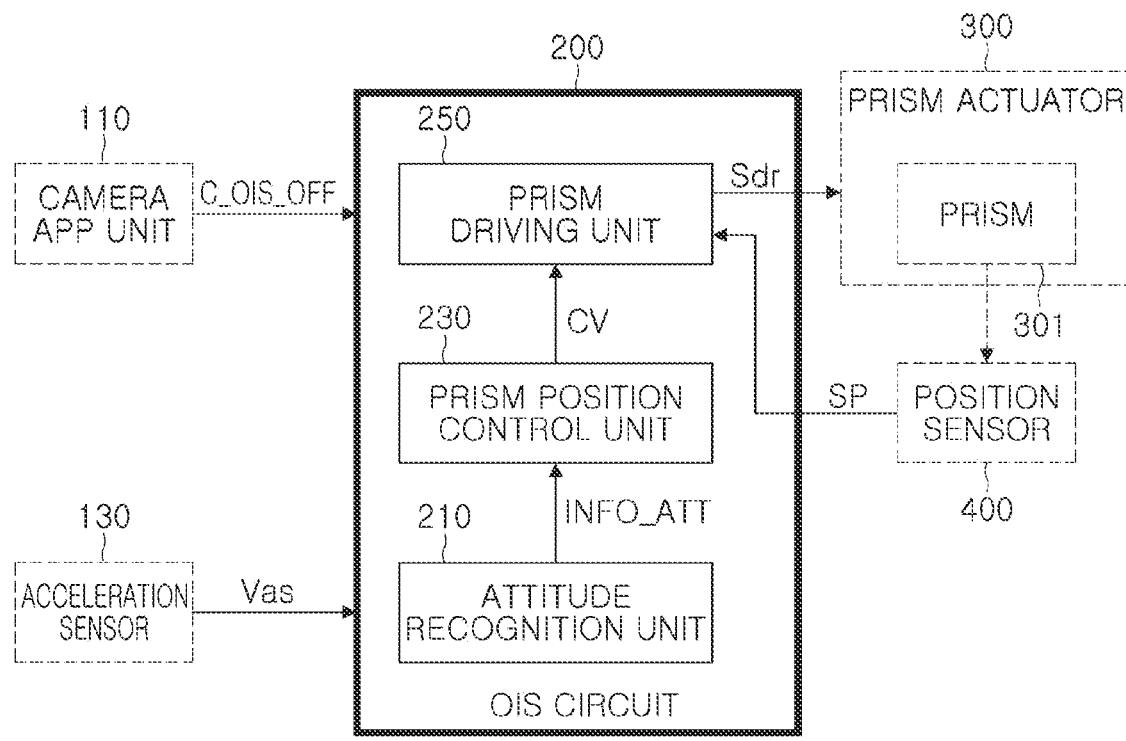
FIG. 1 is an example diagram of an OIS circuit according to an embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an embodiment or example, for example, as to what an embodiment or example may include or implement, means that at least one embodiment or example exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of this disclosure. Further, although the examples described herein have a variety of configurations, other configurations are possible as will be apparent after an understanding of this disclosure.

An aspect of the present disclosure is to provide a folded zoom Optical Image Stabilization (OIS) circuit capable of reducing noise caused by contact (or collisions) between a prism and a housing when a camera app is closed (or an OIS is turned off) and a camera device having the same, in a folded zoom camera device.

Figure 2:
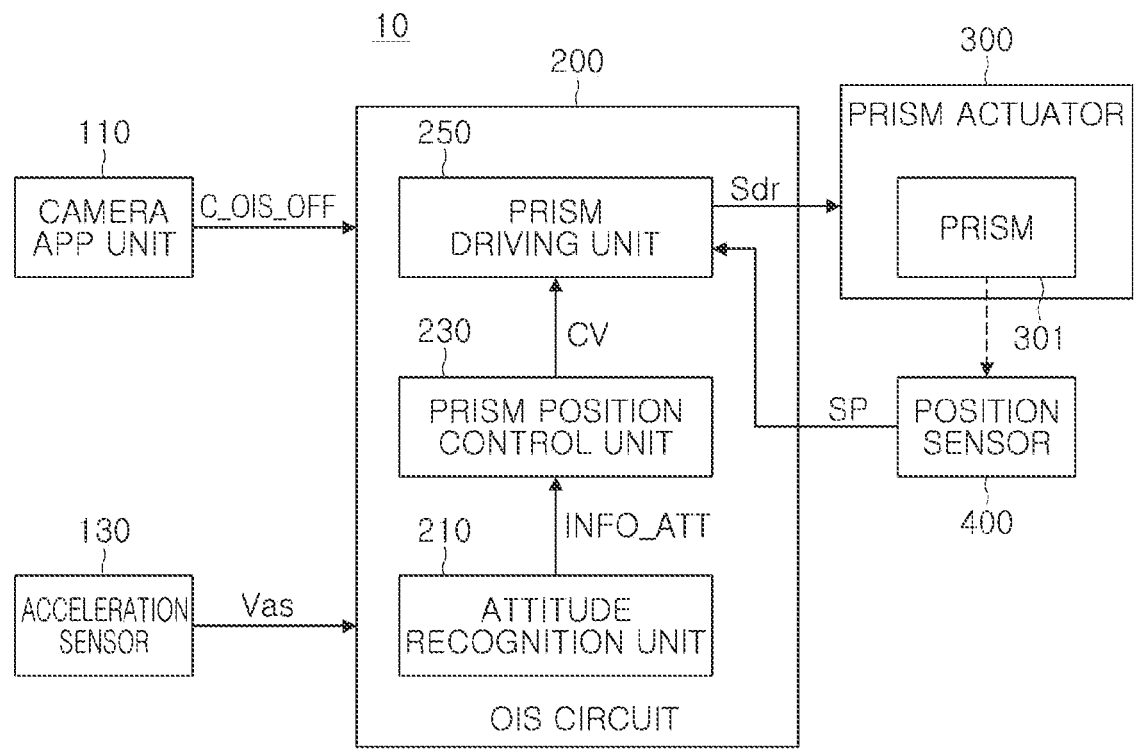
FIG. 2 is an example diagram of a camera device according to an embodiment of the present disclosure.

FIG. 1 is an example diagram of an OIS circuit according to an embodiment of the present disclosure, and FIG. 2 is an example diagram of a camera device according to an embodiment of the present disclosure.

Referring to FIG. 1, an OIS circuit 200 according to an embodiment of the present disclosure may be a folded zoom-type OIS circuit that drives a prism 301 and a prism actuator 300.

The OIS circuit 200 may include an attitude recognition unit 210, a prism position control unit 230, and a prism driving unit 250.

Referring to FIG. 2, a camera device 10 according to an embodiment of the present disclosure may be a folded zoom-type camera device.

The camera device 10 may include a prism 301, a prism actuator 300, a camera app unit 110, an acceleration sensor 130, an OIS circuit 200, and a position sensor 400.

The prism 301 may be disposed in an accommodation space (302 of FIG. 6) of a housing of a prism, be moved by the prism actuator 300, and reflect light for imaging.

The prism actuator 300 may be operated by a driving signal by the OIS circuit 200.

For example, the prism actuator 300 may be a voice coil motor (VCM) actuator. In this case, the prism actuator 300 may include a magnet disposed on the prism 301 and a driving coil disposed on a housing of the prism, and transmit driving force by electromagnetic force through a driving coil to a magnet of the prism 301, to move a position of the prism 301. Since an example of the prism actuator 300 is merely an example, it is not limited thereto.

The camera app unit 110 may output an OIS off command (C_OIS_OFF) to an OIS circuit 200 when a camera app, which is running, is terminated.

The acceleration sensor 130 may sense housing attitude of the folded zoom camera device 10 and output an acceleration sensor value Vas to the OIS circuit 20.

When the OIS off command (C_OIS_OFF) is input, the OIS circuit 200 may control a gradual position movement of the prism to a target position for each housing attitude corresponding to the acceleration sensor value Vas, based on a position sensor signal SP and using a driving signal Sdr, while checking the position of the prism based on the position sensor signal SP.

The position sensor 400 may sense a position of the prism 301 and output the position sensor signal SP to the OIS circuit 200.

As shown in FIG. 1, the OIS circuit 200 shown in FIG. 2 may include an attitude recognition unit 210, a prism position control unit 230, and a prism driving unit 250.

Referring to FIGS. 1 and 2, when an OIS off command (C_OIS_OFF) is input, the attitude recognition unit 210 may recognize housing attitude based on an acceleration sensor value Vas received from the acceleration sensor 130 and output housing attitude information (INFO_ATT).

The prism position control unit 230 may control a gradual position movement of the prism 301 to a corresponding target position matching the housing attitude information (INFO_ATT) received from the attitude recognition unit 210 by using a control value CV.

The prism driving unit 250 may generate a driving signal Sdr using the control value CV received from the prism position control unit 230, and move the prism 301 to a target position TP using the driving signal Sdr.

With respect to each drawing of the present disclosure, unnecessary redundant descriptions of the same reference numerals and components having the same function may be omitted, and possible differences may be described with respect to each drawing.

Figure 3:
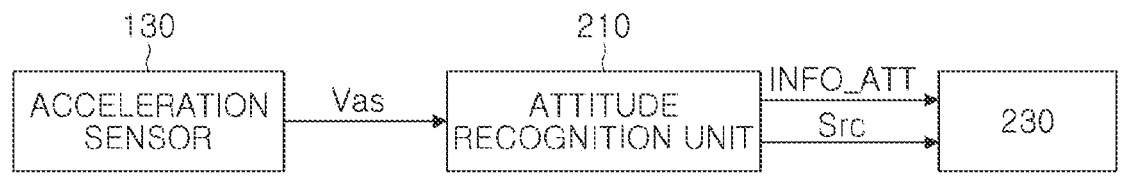
FIG. 3 is an explanatory diagram of an operation of an attitude recognition unit.

FIG. 3 is an explanatory diagram of an operation of an attitude recognition unit.

Referring to FIG. 3, as described above, the attitude recognition unit 210 may output the housing attitude information (INFO_ATT), and in addition, when recognizing the housing attitude, output a recognition completion signal Src.

Figure 4:
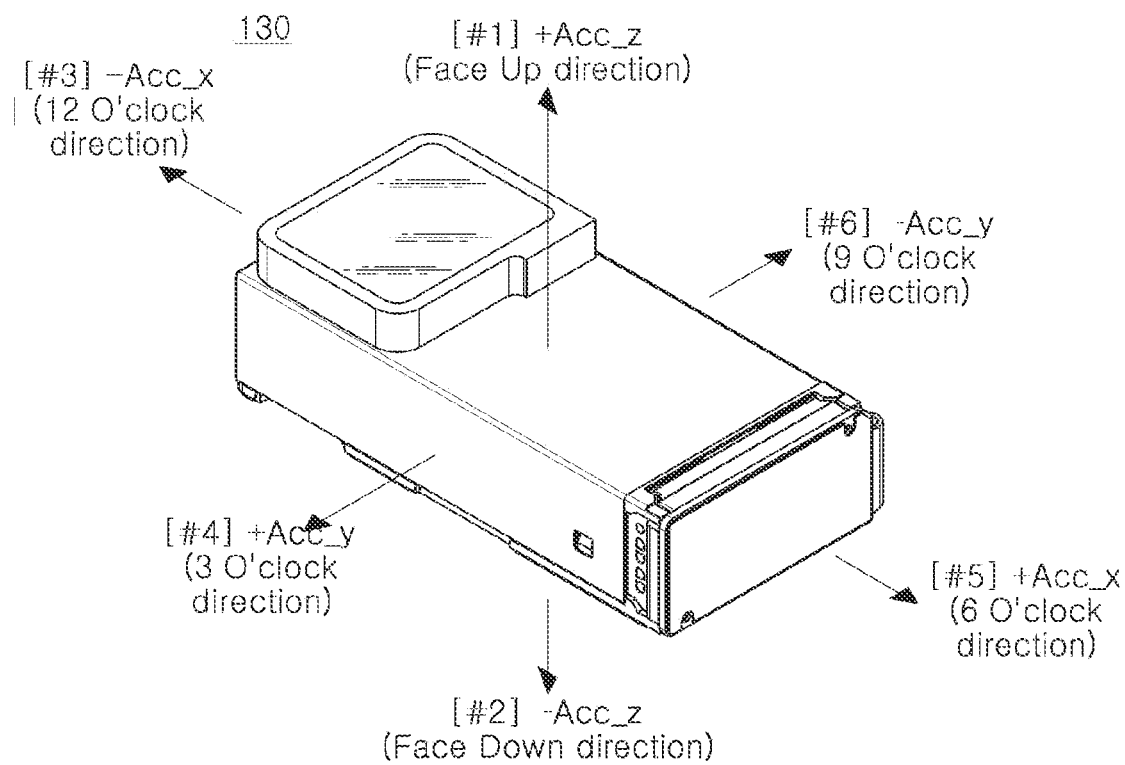
FIG. 4 is an illustrative view of a sensing attitude of an acceleration sensor.

FIG. 4 is an explanatory diagram of sensing attitude of an acceleration sensor.

Referring to FIG. 4, in the case of a 3-axis (X, Y, Z-axis) sensor, the acceleration sensor 130 may sense two directions for each axis of the three axes, thereby sensing acceleration in all six directions. Thus, an acceleration sensor value Vas may be output.

For example, in the case of a 3-axis sensor having an X-axis, a Y-axis, and a Z-axis, six directions may be a first direction (#1) (+Acc_z) (a Face Up direction) and a second direction (#2) (−Acc_z) (a Face Down direction), with respect to the Z-axis direction, and a third direction (#3) (−Acc_x) (a 12 o'clock direction), a fourth direction (#4) (+Acc_y) (a 3 o'clock direction), a fifth direction (#5) (+Acc_x) (a 6 o'clock direction), and a sixth direction (#6) (−Acc_y) (a 9 o'clock direction), with respect to the X-axis and Y-axis directions.

For example, the X axis may be a longitudinal direction of the acceleration sensor 130, the Y axis may be a width direction of the acceleration sensor 130, and the Z axis may be a thickness direction of the acceleration sensor 130 (an up and down direction in FIG. 4).

FIG. 5 is a view illustrating a relation table of an acceleration sensor value, housing attitude, and a target position.

Referring to FIG. 5, examples of the acceleration sensor value Vas may be positive Z(+Z), negative Z(−Z), negative X(−X), positive Y(+Y), and positive of X(+X), and negative Y(−Y).

For example, each of positive Z(+Z), negative Z(−Z), negative X(−X), positive Y(+Y), positive X(+X), and negative Y(−Y), which is the acceleration sensor value Vas, may be an acceleration sensor value, with respect to the first direction (#1) (the Face Up direction), the second direction (#2) (the Face Down direction), and the third direction (#3) (a Prism Up direction) (the 12 o'clock direction), the fourth direction (#4) (a Prism Right direction) (the 3 o'clock direction), and the fifth direction (#5) (a Prism Down direction) and the sixth direction (#6) (a Prism Left direction) (the 9 o'clock direction), which are six attitudes of the housing.

For each of the acceleration sensor values Vas in the six directions described above, a corresponding target position TP may be set as follows according to a corresponding housing attitude.

(1) With respect to the first direction #1 (Face Up direction), the X axis may be set to 'Hall Max' and the Y axis to be set to 'Hall Min.' (2) With respect to the second direction (#2) (Face Down direction), the X axis may be set to 'Hall Max' and the Y axis to be set to 'Hall Max.' (3) For the third direction (#3) (Prism Up direction) (12 o'clock direction), the X axis may be set to 'Hall Max' and the Y axis to be set to 'Hall Min.' (4) With respect to the fourth direction (#4) (Prism Right direction) (3 o'clock direction), the X axis may be set to 'Hall Min' and the Y axis may be set to 'Hall Min.' (5) With respect to the fifth direction (#5) (Prism Down direction), the X axis may be set to 'Hall Max' and the Y axis to be set to 'Hall Min.' (6) With respect to the sixth direction (#6) (Prism Left direction) (9 o'clock direction), the X axis may be set to 'Hall Max' and the Y axis to be set to 'Hall Min.'

Figure 6:
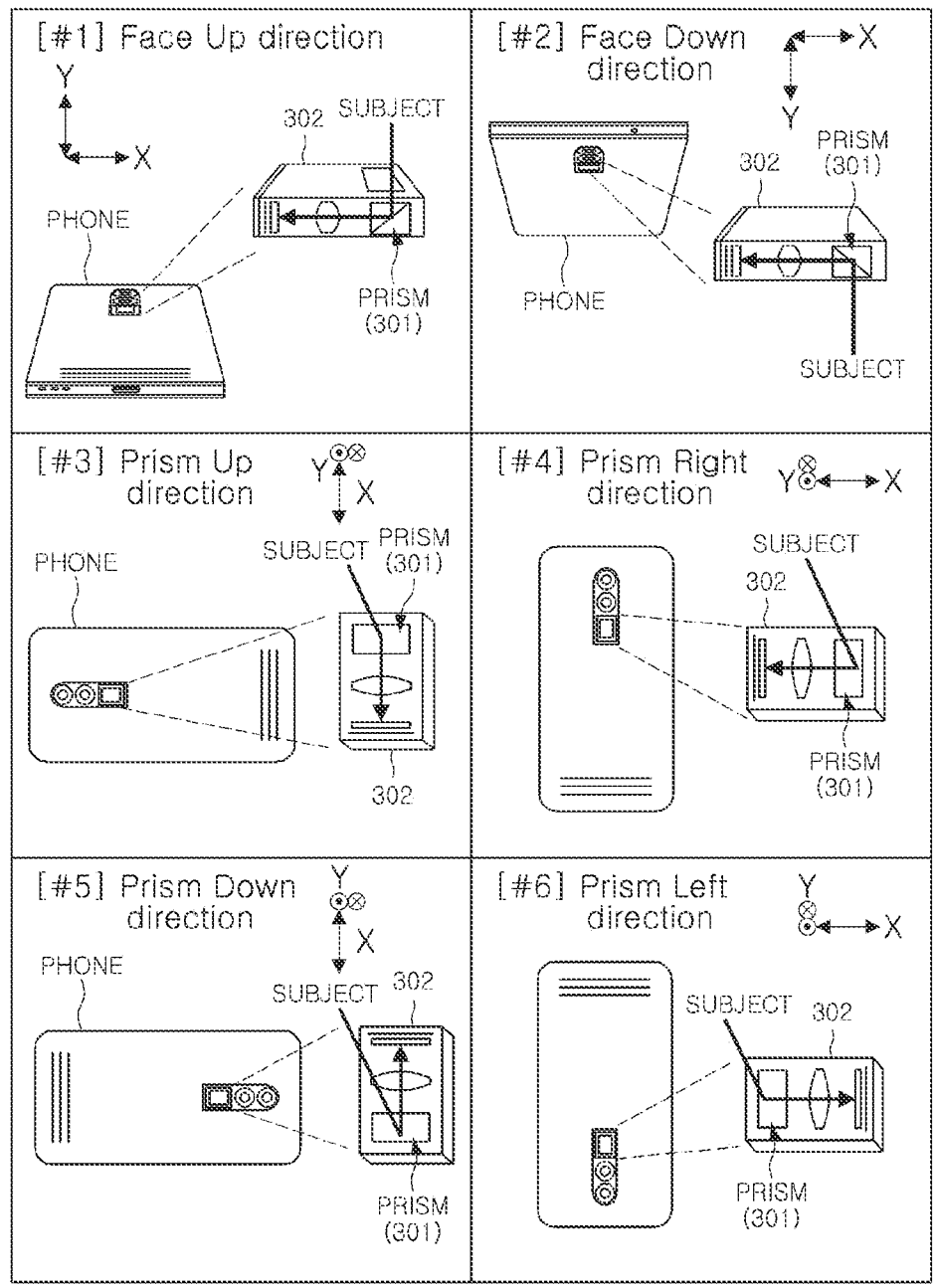
FIG. 6 is an illustrative view of housing attitude.

FIG. 6 is an illustrative view of housing attitude.

Referring to FIG. 6, six directions with respect to the attitude of the housing will be described as follows.

The first direction #1 (Face Up direction) is a direction in which a photographing direction of the camera device 10 faces upwardly. The second direction #2 (Face Down direction) is a direction in which a photographing direction faces downwardly. The third direction (#3) (Prism Up direction) (12 o'clock direction) is a direction in which a photographing direction is directed to a side and the prism 301 is positioned above the accommodation space 302. The fourth direction (#4) (Prism Right direction) (3 o'clock direction) is a direction in which a photographing direction is directed to a side and the prism 301 is located on a right side of the accommodation space 302. The fifth direction (#5) (Prism Down direction) is a direction in which a photographing direction is directed to a side and the prism 301 is positioned below the accommodation space 302. The sixth direction (#6) (Prism Left direction) (9 o'clock direction) is a direction in which a photographing direction is directed to a side and the prism 301 is located on a left side of the accommodation space 302.

Figure 7:
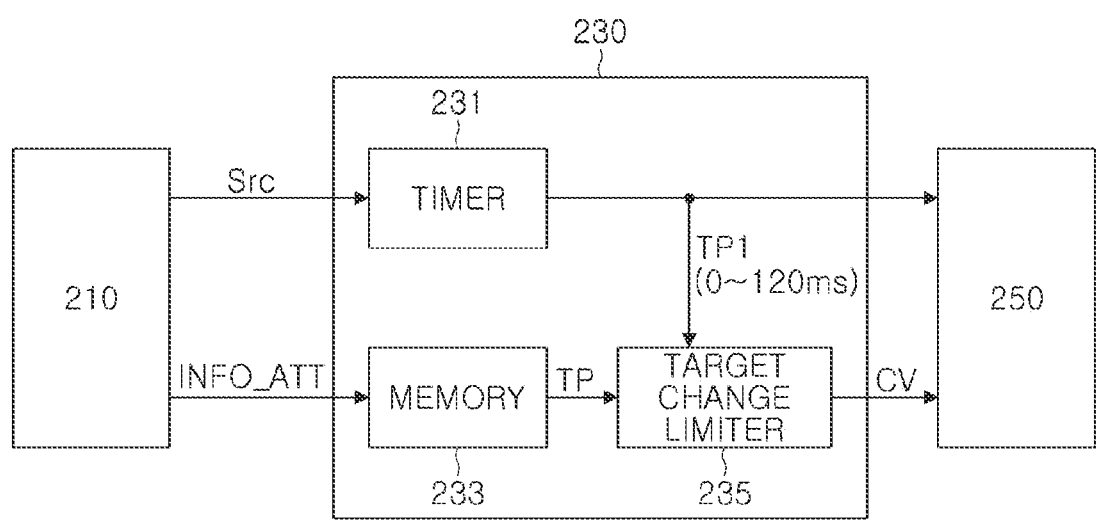
FIG. 7 is an example diagram of a prism position control unit.

FIG. 7 is an example diagram of a prism position control unit.

Referring to FIG. 7, the prism position control unit 230 may include a timer 231, a memory 233, and a target change limiter 235.

The timer 231 may start counting time when a recognition completion signal Src is input from the attitude recognition unit 210, and provide a time count value to the target change limiter 235 and the prism driving unit 250.

The memory 233 may output a corresponding target position TP matching the housing attitude information (INFO_ATT). For example, as described with reference to FIG. 5, the memory 233 stores target positions TP matched for each attitude of the housing.

The target change limiter 235 may generate a control value CV, which gradually increases, in order to control a gradual position movement of the prism 301 to the corresponding target position TP during a first time period TP1 based on the time count value of the timer 231, to output the control value CV to the prism driving unit 250.

For example, the 'gradual position movement' does not mean a sudden movement immediately, but means moving at a constant speed from an initial position to the target position TP during the first time period TP1 in order to reduce the collision (contact) noise between the prism 301 and the housing.

Figure 8:
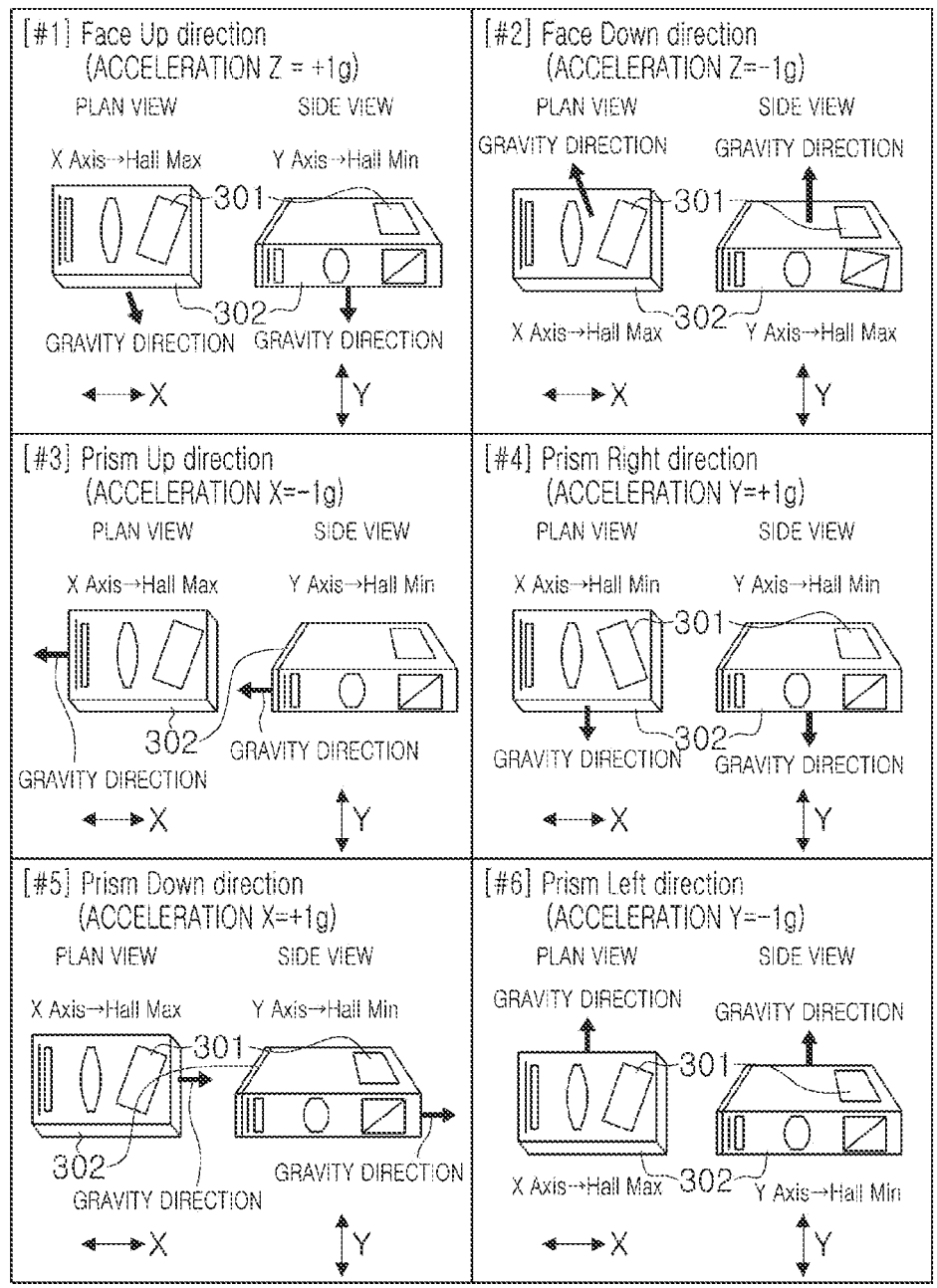
FIG. 8 is an illustrative view of a target position according to housing attitude.

FIG. 8 is an explanatory diagram of a target position according to housing attitude.

In FIG. 8, with respect to the housing attitudes of the six camera devices described above, an X-axis may be a longitudinal direction of an accommodation space 302 in which a prism 301 is accommodated, and a Y-axis may be a thickness direction of an electronic device (e.g., phone) to which a camera device is applied.

Referring to FIG. 8, a target position TP may be a position to be moved to reduce collision (contact) noise between the prism 301 and the housing, and may be set as follows according to a direction of the housing attitude as described with reference to FIG. 5.

(1) In the case of a first direction (#1), as the target position, an X-axis may be 'Hall Max' and a Y-axis may be 'Hall Min.' (2) In the case of a second direction (#2), an X-axis may be 'Hall Max' and a Y-axis may be 'Hall Max.' (3) In the case of a third direction (#3), n X-axis may be 'Hall Max' and a Y-axis may be 'Hall Min.' (4) In the case of a fourth direction (#4), an X axis may be 'Hall Min' and a Y axis may be 'Hall Min.' (5) In the case of a fifth direction (#5), an X-axis may be 'Hall Max' and a Y-axis may be 'Hall Min.' (6) In the case of a sixth direction (#6), an X-axis may be 'Hall Max' and a Y-axis may be 'Hall Min.'

Figure 9:
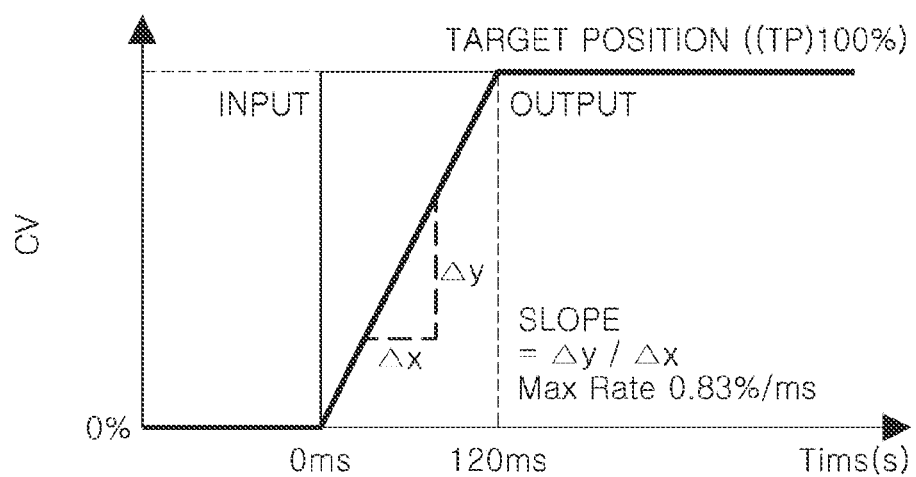
FIG. 9 is an example diagram of a control value output from a target change limiter.

FIG. 9 is an example diagram of a control value output from a target change limiter.

Referring to FIG. 9, in order to reduce collision (contact) noise between a prism and a housing, in order to gradually move the prism from an initial position to a target position TP for a first time period TP1 (e.g., 0 ms to 120 ms), a control value CV output from a time change limiter 235 may be a value that increases linearly.

For example, a rising slope ($\Delta y/\Delta x$) of the control value CV for moving it from the initial position to the target position TP may be 0.83%/ms when the target position TP is 100%. Since this is merely an example, the present disclosure is not limited thereto.

Figure 10:
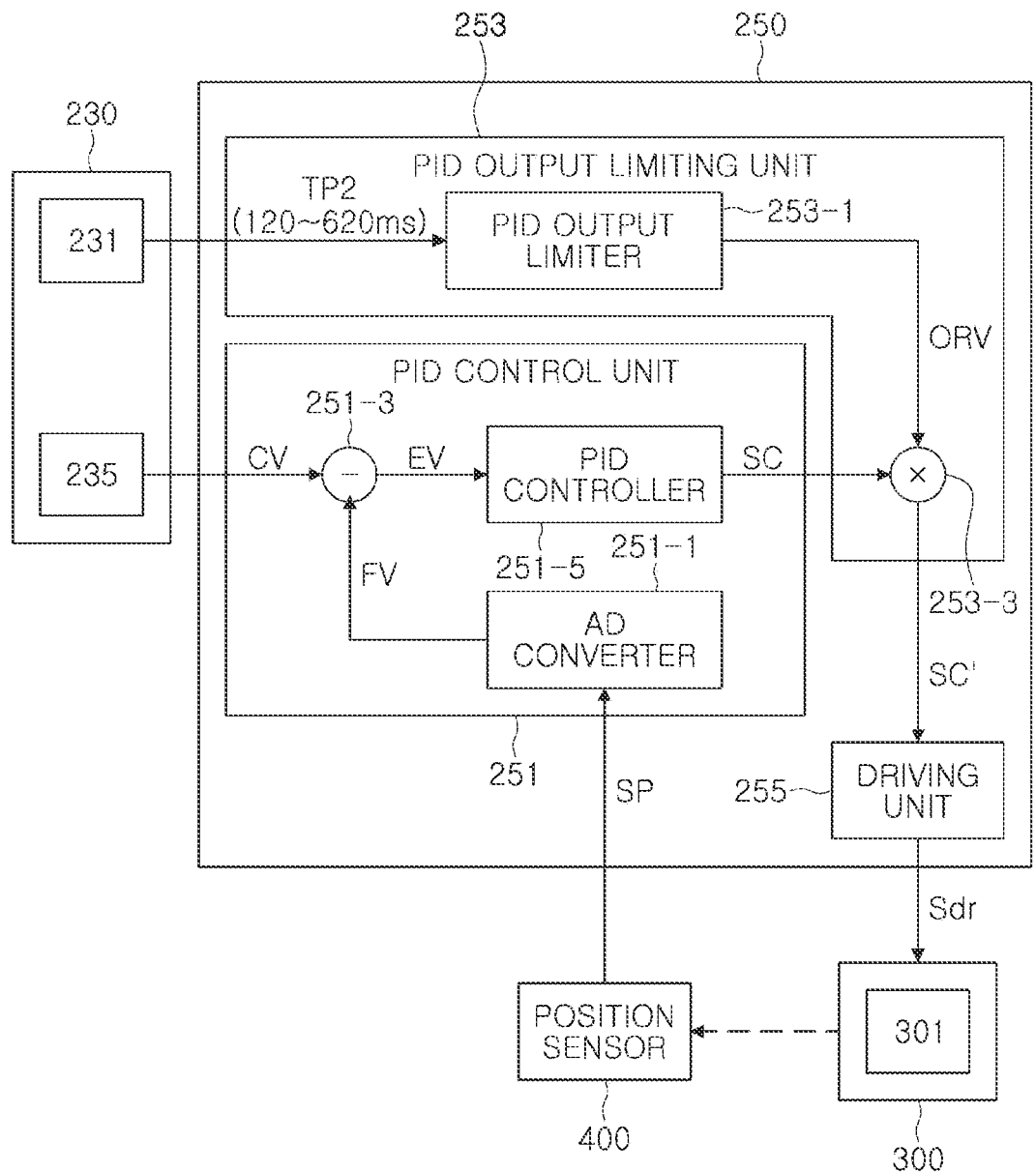
FIG. 10 is an example view of a prism driving unit.

FIG. 10 is an example view of a prism driving unit.

Referring to FIG. 10, the prism driving unit 250 may control a gradual position movement of the prism 301 to the corresponding target position TP, based on the control value CV of the prism position control unit 230, and may gradually decrease a driving value of the prism 301, when the prism 301 reaches the corresponding target position TP.

For example, the prism driving unit 250 may include a proportional-integral-derivative (PID) control unit 251, a PID output limiting unit 253, and a driving unit 255.

The PID control unit 251 may generate a control signal SC for controlling the gradual position movement of the prism 301 to the corresponding target position TP, based on a control value CV and a feedback value FV of the prism position control unit 230 during a first time period TP1.

The PID output limiting unit 253 may output a control signal SC from the PID control unit 251 during the first time period TP1, and gradually decrease a magnitude of the control signal SC from the PID control unit 251 during a second time period TP2, after the first time period TP1.

The driving unit 255 may generate a driving current based on a control signal from the PID output limiting unit 253 and output the same to the prism actuator 300.

For example, the PID control unit 251 may include an analog-to-digital (AD) converter 251-1, a first operator 251-3, and a PID controller 251-5.

The AD converter 251-1 may convert a position sensor signal SP of the prism 301 into a digital feedback value FV.

The first operator 251-3 may operate the feedback value FV from the AD converter 251-1 and the control value CV of the prism position controller 230 to output an error value EV.

The PID controller 251-5 may generate a control signal for the gradual position movement of the prism 301 to the corresponding target position TP based on the error value EV from the first operator 251-3.

For example, the PID output limiting unit 253 may include a PID output limiter 253-1 and a second operator 253-3.

The PID output limiter 253-1 may generate the highest output ratio value ORV (e.g., 100%) during the first time period TP1, and generate an output ratio value ORV that gradually decreases to limit the control signal SC, during a second time period TP2, after the first time period TP1.

The second operator 253-3 may multiply a control signal SC from the PID control unit 251 and an output ratio value ORV from the PID output limiter 253-1, to generate a control signal SC' whose output ratio is adjusted.

Figure 11:
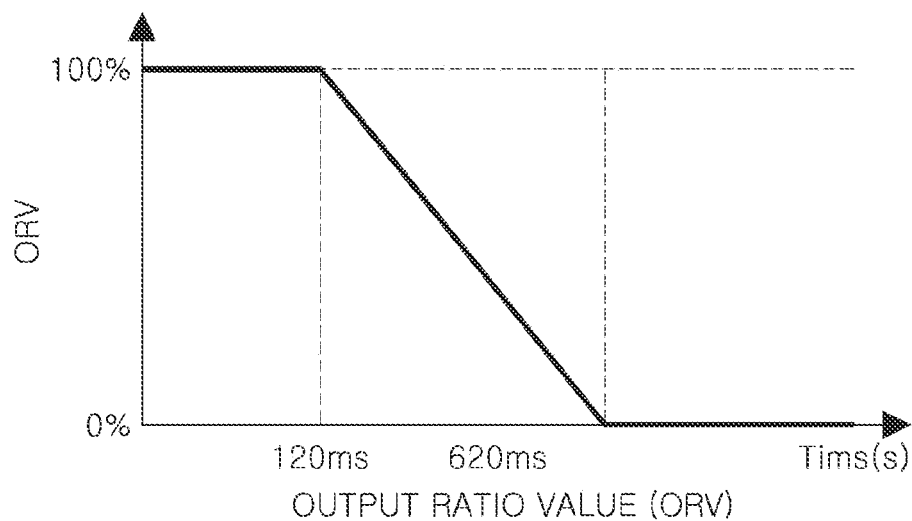
FIG. 11 is an example diagram of an output ratio value output from a PID output limiter.

FIG. 11 is an example diagram of an output ratio value output from a PID output limiter.

Referring to FIG. 11, it can be seen that an output ratio value ORV output from the PID output limiter 253 decreases linearly from 100% to 0%, during a second time period TP2 (e.g., 120 ms to 620 ms) after the first time period TP1.

Figure 12:
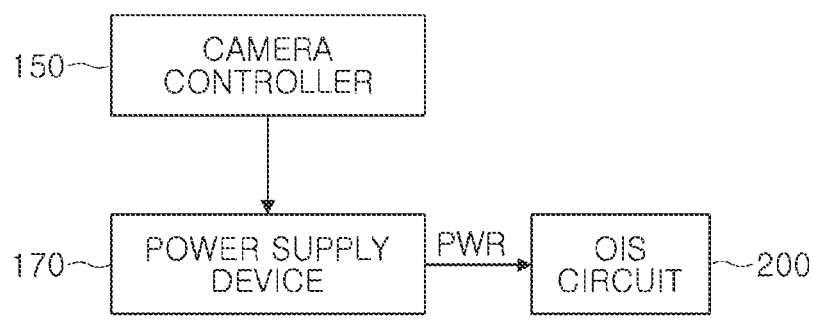
FIG. 12 is an example diagram of a camera controller and a power supply device.

FIG. 12 is an example diagram of a camera controller and a power supply device.

Referring to FIG. 12, a folded zoom camera device 10 may further include a camera controller 150 and a power supply device 170.

The camera controller 150 may operate an internal timer when the OIS off command (C_OIS_OFF) is input, to control a stop of a power supply of the OIS circuit when there is a power stop time T3.

The power supply 170 may stop supplying power when there is a power supply stop control signal PWR from the camera controller 150 while supplying power to the OIS circuit 200.

Figure 13:
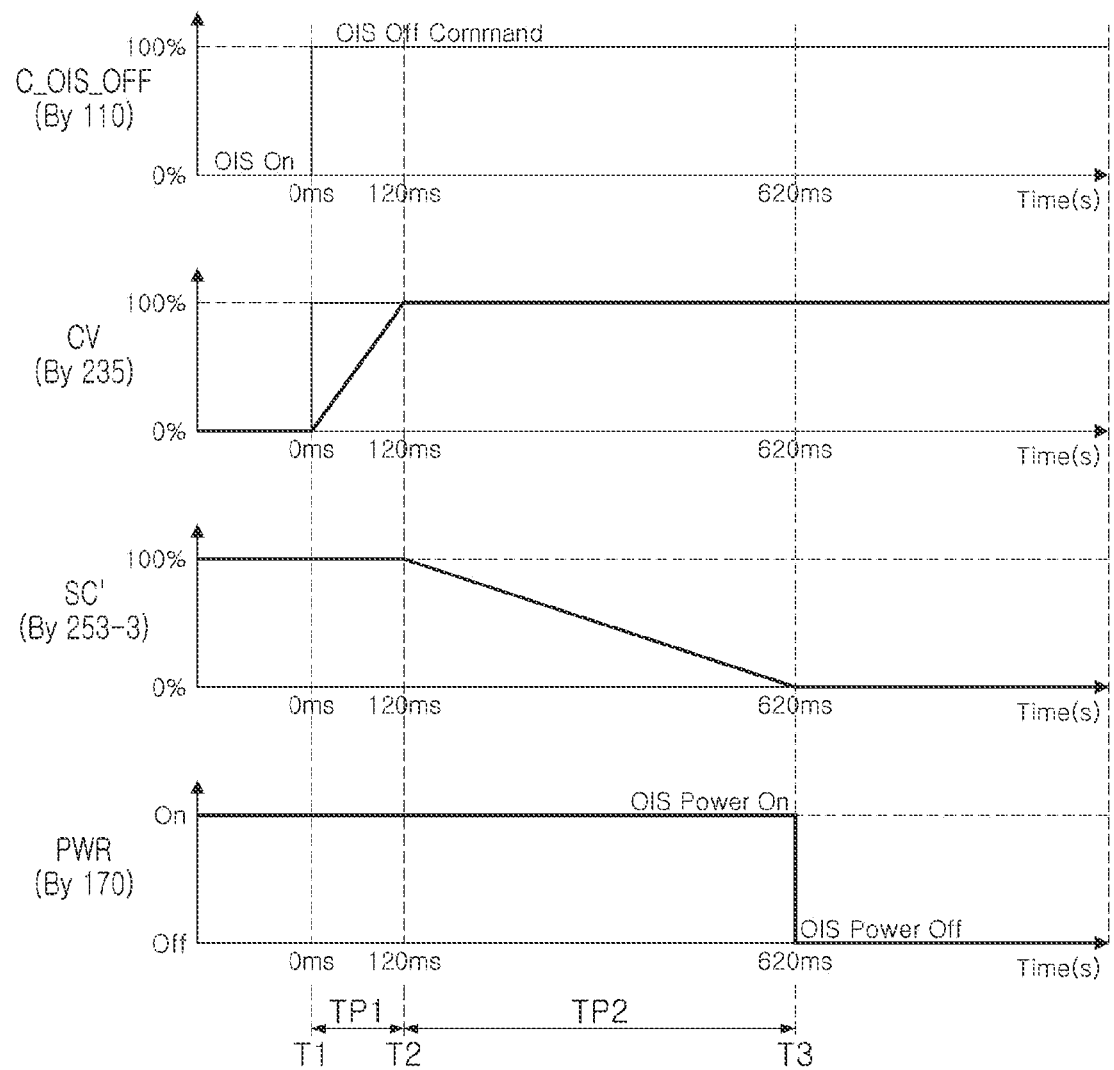
FIG. 13 is a timing chart for main signals of a camera device.
Figure 14A:
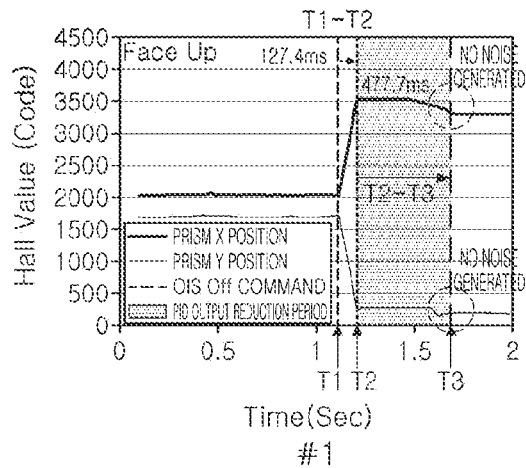
FIGS. 14(a)-(f) are illustrative views of noise measurement results according to the target position control results for each housing attitude.
Figure 14B:
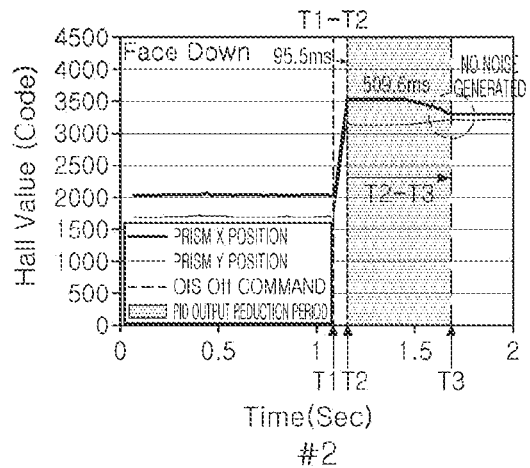
Figure 14C:
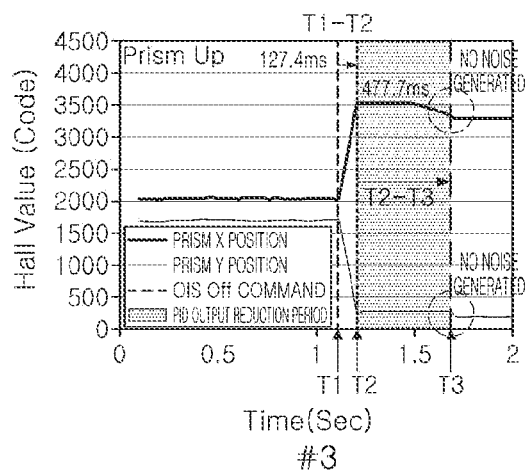
Figure 14D:
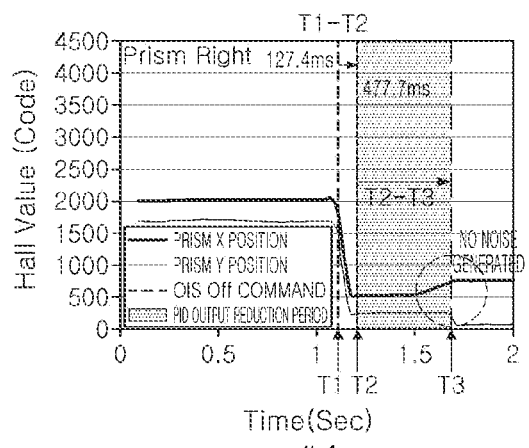
Figure 14E:
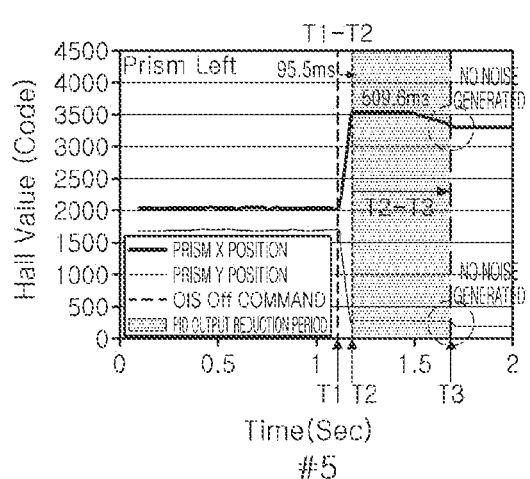
Figure 14F:
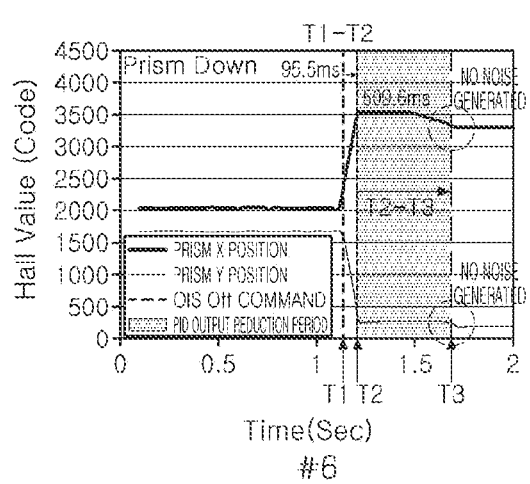

FIG. 13 is a timing chart for main signals of a camera device.

In FIG. 13, C_OIS_OFF is an OIS off command output by a camera app unit 110 to an OIS circuit 200 when a camera app, which is running, is terminated. CV is a control value output from a target change limiter 235 to a prism driving unit 250. SC' is a control signal SC' obtained by multiplying a control signal SC from the PID control unit 251 and an output ratio value ORV from the PID output limiter 253-1, whose output ratio is adjusted by the second operator 253-3. PWR is a power supply stop control signal PWR provided to an OIS circuit 200 by the power supply device 170.

In addition, in FIG. 13, the first time period TP1 is a time period set based on a time point at which the housing attitude is recognized, and may be, for example, a period of 0 msec to 120 msec.

The second time period TP2 is a time period set based on a time point at which the housing attitude is recognized, and may be, for example, a period of 120 msec to 620 msec.

The power stop time T3 may be set to be synchronized with an end time of the second time period TP2.

FIG. 14(a)-(f) are illustrative views of noise measurement results according to target position control results for each housing attitude.

FIGS. 14(a), 14(b), 14(c), 14(d), 14(e), and 14(f) are views illustrating simulation results for a case in which a prism is gradually moved to the target position TP (a target position in a Y-axis direction and a target position in an X-axis direction) matched for each of six housing attitudes described above.

Referring to FIGS. 14(a) to 14(f), it can be seen that, as a result of gradually moving the prism to the target position for each of the six housing attitudes, no noise was generated.

As set forth above, according to an embodiment of the present disclosure, in a folded zoom camera device, it is possible to reduce noise due to contact (or collision) between a prism and a housing when a camera app is terminated (when OIS is turned off).

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A folded zoom optical image stabilization (OIS) circuit for driving a prism and a prism actuator, comprising:
an attitude recognition unit configured to recognize housing attitude based on an acceleration sensor value received from an acceleration sensor when an OIS off command is input, and to output housing attitude information;
a prism position control unit configured to control a gradual position movement of the prism to a corresponding target position matching the housing attitude information received from the attitude recognition unit; and
a prism driving unit configured to move the prism to a target position under a control of the prism position control unit.

2. The folded zoom OIS circuit of claim 1, wherein the attitude recognition unit is configured to output a recognition completion signal, when outputting the housing attitude information.

3. The folded zoom OIS circuit of claim 1, wherein the prism position control unit comprises:
a timer configured to start time counting when a recognition completion signal is input from the attitude recognition unit;
a memory configured to output a corresponding target position matching the housing attitude information; and
a target change limiter configured to generate a control value that gradually increases to control a gradual position movement of the prism to the corresponding target position during a first time period, based on a time count value of the timer.

4. The folded zoom OIS circuit of claim 1, wherein the prism driving unit is configured to control the gradual position movement of the prism to the corresponding target position, based on the control value of the prism position control unit, and to gradually decrease a driving value of the prism, when the prism reaches the corresponding target position.

5. The folded zoom OIS circuit of claim 1, wherein the prism driving unit comprises:
a proportional-integral-derivative (PID) control unit configured to generate a control signal for controlling the gradual position movement of the prism to the corresponding target position, based on a control value and a feedback value of the prism position control unit, during a first time period;
a PID output limiting unit configured to output a control signal from the PID control unit during the first time period, and to gradually decrease a magnitude of the control signal from the PID control unit, during a second time period after the first time period; and
a driving unit configured to generate a driving current based on a control signal from the PID output limiting unit, and to output the same to the prism actuator.

6. The folded zoom OIS circuit of claim 5, wherein the PID control unit comprises:
an analog-to-digital (AD) converter configured to convert a position sensor signal of the prism into a digital feedback value;
a first operator configured to operate a feedback value from the AD converter and a control value of the prism position control unit to output an error value; and
a PID controller configured to generate a control signal for a gradual position movement of the prism to the corresponding target position, based on the error value from the first operator.

7. The folded zoom OIS circuit of claim 5, wherein the PID output limiting unit comprises:
a PID output limiter configured to generate a maximum output ratio value during the first time period, and to generate an output ratio value, which gradually decreases, to limit the control signal during a second time period after the first time period; and
a second operator configured to generate a control signal of which an output ratio value is adjusted, by multiplying the control signal from the PID control unit and the output ratio value form the PID output limiter.

8. A folded zoom camera device, comprising:
a prism actuator configured to move a position of a prism;
a camera app unit configured to output an optical image stabilization (OIS) off command when a camera app, which is running, is terminated;
an acceleration sensor configured to sense housing attitude of the folded zoom camera device to output an acceleration sensor value;
an OIS circuit configured to control a gradual position movement of the prism to a target position for each housing attitude corresponding to the acceleration sensor value, while checking the position of the prism by operating the prism actuator, when the OIS off command is input; and
a position sensor configured to sense the position of the prism to output a position sensor signal to the OIS circuit.

9. The folded zoom camera device of claim 8, wherein the OIS circuit comprises:
an attitude recognition unit configured to recognize housing attitude based on an acceleration sensor value from the acceleration sensor when an OIS off command is input from the camera app unit, and to output housing attitude information;
a prism position control unit configured to control a gradual position movement of the prism to a corresponding target position matching the housing attitude information received from the attitude recognition unit; and
a prism driving unit configured to gradually move the prism to a target position according to a control of the prism position control unit.

10. The folded zoom camera device of claim 9, wherein the attitude recognition unit is configured to output a recognition completion signal, when outputting the housing attitude information.

11. The folded zoom camera device of claim 9, wherein the prism position control unit comprises:
a timer configured to start time counting when a recognition completion signal is received from the attitude recognition unit;
a memory configured to output a corresponding target position matching the housing attitude information; and
a target change limiter configured to generate a control value which gradually increases, to control the gradual position movement of the prism to the corresponding target position during a first time period, based on a time count value of the timer.

12. The folded zoom camera device of claim 9, wherein the prism driving unit is configured to control the gradual position movement of the prism to the corresponding target position, based on a control value of the prism position control unit, and to gradually decrease a driving value of the prism, when the prism reaches the corresponding target position.

13. The folded zoom camera device of claim 9, wherein the prism driving unit comprises:
   a proportional-integral-derivative (PID) control unit configured to generate a control signal for controlling a gradual position movement of the prism to the corresponding target position, based on a control value and a feedback value of the prism position control unit, during a first time period;
   a PID output limiting unit configured to output a control signal from the PID control unit during the first time period, and to gradually decrease a magnitude of the control signal from the PID control unit, during a second time period after the first time period; and
   a driving unit configured to generate a driving current based on a control signal from the PID output limiting unit, and to output the same to the prism actuator.

14. The folded zoom camera device of claim 13, wherein the PID control unit comprises,
   an analog-to-digital (AD) converter configured to convert a position sensor signal of the prism into a digital feedback value;
   a first operator configured to operate a feedback value from the AD converter and a control value of the prism position control unit to output an error value; and
   a PID controller configured to generate a control signal for a gradual position movement of the prism to the corresponding target position, based on the error value from the first operator.

15. The folded zoom camera device of claim 13, wherein the PID output limiting unit, comprises:
   a PID output limiter configured to generate a maximum output ratio value during the first time period, and to generate an output ratio value, which gradually decreases, to limit the control signal during a second time period, after the first time period; and
   a second operator configured to generate a control signal of which an output ratio value is adjusted, by multiplying the control signal from the PID control unit and the output ratio value from the PID output limiter.

16. The folded zoom camera device of claim 8, further comprising:
   a camera controller configured to operate an internal timer when the OIS off command is input, and to control power supply stopping of the OIS circuit when the power supply is stopped; and
   a power supply device configured to stop power supply when there is a power supply stop control from the camera controller, while supplying power to the OIS circuit.

17. An optical image stabilization (OIS) circuit for driving a prism, comprising:
   an attitude recognition unit configured to determine an attitude when an OIS off command is input and to output a target position in response to the attitude determination; and
   a prism driving unit configured to move the prism gradually to the target position.

18. The OIS circuit of claim 17, further comprising a prism position control unit configured to control the prism driving unit to control the gradual movement of the prism to the target position matching the attitude determination.

19. A camera device comprising:
   the OIS circuit of claim 17; and
   a camera app unit configured to output the OIS off command when a camera app, which is running, is terminated.

20. The camera device of claim 19, further comprising:
   a prism actuator configured to receive a driving signal from the prism driving unit to move a position of the prism;
   an acceleration sensor configured to sense the attitude and to output an acceleration sensor value, wherein the attitude recognition unit is configured to determine the attitude based on the acceleration sensor value; and
   a position sensor configured to sense a position of the prism and to output a position sensor signal to the prism driving unit as feedback control.

* * * * *